(12) United States Patent
Meirowitz

(10) Patent No.: US 7,272,829 B1
(45) Date of Patent: Sep. 18, 2007

(54) FACTORED ASSERT CHAINS

(75) Inventor: Diane R. Meirowitz, Arlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 859 days.

(21) Appl. No.: 10/625,334

(22) Filed: Jul. 22, 2003

(51) Int. Cl.
*G06F 9/45* (2006.01)

(52) U.S. Cl. ............... 717/155; 717/140; 717/148; 717/154

(58) Field of Classification Search ............... 717/140, 717/144, 150
See application file for complete search history.

(56) References Cited

U.S. PATENT DOCUMENTS

| | | | | |
|---|---|---|---|---|
| 5,448,737 | A | * | 9/1995 | Burke et al. ............... 717/146 |
| 6,091,897 | A | * | 7/2000 | Yates et al. ............... 717/138 |
| 6,199,095 | B1 | * | 3/2001 | Robinson ................... 718/107 |
| 2002/0078436 | A1 | * | 6/2002 | Clarke ....................... 717/155 |

OTHER PUBLICATIONS

Wolfe, Michael, "High Performance Compilers For Parallel Computing", *Oregon Graduate Institute of Science & Technology*, Chapter 6, pp. 166-223, Addison-Wesley Publishing Company, Inc. (1996).

* cited by examiner

*Primary Examiner*—Tuan Dam
*Assistant Examiner*—Isaac Tecklu
(74) *Attorney, Agent, or Firm*—Gunnison, McKay & Hodgson, L.L.P.

(57) ABSTRACT

Factored assert chains allow for improved tracking of implicit information in a computer program. The compiler may generate assert statements at various points in the program where there is implicit information. The dominator tree for the program or section of program may then be constructed. Then φ-nodes may be inserted throughout a control flow graph. Following that, for each statement in the program or section of program, an assert chain may be constructed from each use to the most recent available assert statement for the variable. Then, if the statement is an assert statement, each use may be kept track of as a mapping to an assertion, otherwise a mapping of any reference to an assert statement for each definition may be deleted. This may then iterate through the dominator tree. At the end, a series of factored assert chains remains, which may be utilized by the compiler to improve the efficiency of generated code.

33 Claims, 3 Drawing Sheets

FACTORED ASSERT CHAINS

FIELD OF THE INVENTION

The present invention relates to the field of computer software compilers. More particularly, the present invention relates to a factored assert chains for improving the efficiency of generated code.

BACKGROUND OF THE INVENTION

Computer software compilers take programs written in high-level programming languages (such as C and Fortran) and translate them into machine language. It is important that the compiler optimize this machine code so that it will run more efficiently. Hence, in parallel computers, compilers often also serve as a mechanism to schedule and organize a computer program so that it may be run at improved efficiency.

In order to accomplish this goal, a compiler often needs to know precise information about variables throughout the program. For example, in a for-do loop, the fact that a variable always has a constant value inside the loop would be important information for the compiler to know, as then it could reorder the placement of the loop in the schedule of statements without fear of disrupting a use of the variable later in the program.

A definition of a variable can be said to reach a use of the variable if there is a path in the control flow graph from the definition to its use that does not contain any other definitions of the variable. A compiler can find all the reaching definitions at each use by utilizing a data-flow analysis. One common technique to track this information is to create what is known as use-def chains, which are chains linking reaching definitions to each use. Creation of use-def chains is known in the art and thus will not be discussed in great detail in the present document.

Several problems, however, can occur with use-def chains and reaching definitions. First, they are not very space efficient. Reaching definitions bit-vectors can use d bits at each node in the control flow graph, wherein d is the number of definitions in the program. Additionally, use-def chains often contain redundant information. Second, the resulting information is not as precise as it could be. This is especially true when conditionals are used in the program, as if the conditional, for example, was known to be always false, this information would not be tracked anywhere in the use-def chain.

In order to solve this problem, the concept of factored use-def chains (FUD chains) was introduced. FUD chains have two important properties. First, each use of a variable is reached by a single definition. Second, control-flow merge points are handled in a special way. Merge points exist where multiple reaching definitions exist in the original program. At merge points, special merge operators called $\phi$-terms are inserted into the program where there are multiple reaching definitions. The $\phi$-term serves as the reaching definition for any uses after the control-flow merge, at which point it factors the reaching definitions.

Creating factored use-def chains is a three part process. First, a dominator tree is created for the program. A node X may be said to dominate node Y if all paths from entry (the path entering the block of nodes) to Y include X. This may be written as X DOM Y. A dominator tree is simply a convenient way to represent the DOM relation of a control flow graph. The dominator tree is rooted at Entry, with an edge from X to Y if X is an immediate dominator of Y. An immediate dominator is the closest strict dominator, wherein X strictly dominates Y if X DOM Y and X≠Y.

The second part of creating factored use-def chains involves placement of the $\phi$-terms. This requires the compiler to identify the control flow graph nodes that have assignments to each variable. Additionally, the Entry node is considered to have an assignment to each variable in the program. Additionally, a slicing edge from Entry to Exit adds a $\phi$-term at Exit for each variable that is assigned in the program.

In order to accomplish this, the compiler may execute an algorithm. This algorithm assumes the following data structures are available:

1. DF(X) is the dominance frontier for the control flow graph node X (A dominance frontier of node X is the set of nodes Z such that X dominates some predecessors of Z, but not all].

2. D(M) is the set of control flow graph nodes that contain assignments or definitions to variable M.

3. Symbols is the set of symbols or variables in the program.

Additionally, the algorithm uses the following data structures.

1. WorkList is a work list of control flow graph nodes; each node that contains an assignment or $\phi$-term will be added to the work list.

2. Added(X) is used to determine whether a $\phi$-term for the current variable has already been inserted at node X.

3. InWork(X) is used to determine whether node X has already been added to WorkList for the current variable.

The algorithm may be as follows:

```
(1)       for X ∈ V do
(2)           InWork(X) = ⊥
(3)           Added(X) = ⊥
(4)       endfor
(5)       WorkList = ∅
(6)       for M ∈ Symbols do
(7)           for X ∈ D(M) do
(8)               WorkList = WorkList ∪ {X}
(9)               InWork(X) = M
(10)          endfor
(11)          while WorkList ≠ ∅ do
(12)              remove some node X from WorkList
(13)              for W ∈ DF(X) do
(14)                  if Added(W) ≠ M then
(15)                      add φ-term for M at W
(16)                      Added(W) = M
(17)                      if InWork(W) ≠ M then
(18)                          WorkList = Worklist ∪ {W}
(19)                          InWork(X) = M
(20)                      endif
(21)                  endif
(22)              endfor
(23)          endwhile
(24)      endfor
```

The third part of creating factored use-def chains the creation of the chains themselves. This may be accomplished through a depth-first traversal of the dominator tree, starting at Entry. The algorithm assumes the following data structures or functions are available.

1. Child(X) is the set of dominator children of node X

2. SUCC(X) is the set of control flow graph successors of X

3. WhichPred(X→Y) is an index telling which predecessor of Y corresponds to the control flow graph edge from X.

Additionally, the algorithm uses the following data structures

1. CurrDef(M) is a link from the symbol table entry for variable M to the "current" definition of that variable 2. Chain(R) is a link from a use of a variable at reference R to the reaching definition or ϕ-term.

3. ϕ-Chain(R)[J] is a vector of links from a ϕ-term at reference R to the reaching definitions along each control flow graph predecessor.

4. SaveChain(R) is a temporary placeholder to save the old reaching definition when a new definition or ϕ-term is reached.

The algorithm may be as follows.

```
(1)   for M ∈ Symbols do
(2)       CurrDef(M) = ⊥
(3)   endfor
(4)   Search(Entry)
(5)   procedure Search(X)
(6)       for each variable use or def or ϕ-term R ∈ X do
(7)           let M be the variable referenced at R
(8)           if R is a use then
(9)               Chain(R) = CurrDef(M)
(10)          else if R is a def or ϕ-term then
(11)              SaveChain(R) = CurrDef(M)
(12)              CurrDef(M) = R
(13)          endif
(14)      endfor
(15)      for Y ∈ SUCC(X) do
(16)          J = WhichPred(X → Y)
(17)          for each ϕ-term R ∈ Y do
(18)              let M be the variable referenced at R
(19)              ϕ-Chain(R)[J] = CurrDef(M)
(20)          endfor
(21)      endfor
(22)      for Y ∈ Child(X) do
(23)          Search(Y)
(24)      endfor
(25)      for each variable use or def or ϕ-term R ∈ X in reverse order do
(26)          let M be the variable referenced at R
(27)          if R is a def or a ϕ-term then
(28)              CurrDef(M) = SaveChain(R)
(29)          endif
(30)      endfor
(31)  end Search
```

The problem with these prior art algorithms is that they do not handle assert statements, or other statements in the compiler code that contain information regarding variables, for example, their values. An assert statement is generally a statement inserted into the code that identifies known information regarding a variable at a specific point in the program. Essentially, they make explicit what is normally just implicit in a program. This information could be quite helpful for the compiler to access and utilize, but currently there is no technique available to factor or otherwise organize this assert information. These assert statements could be inserted either by the user or the compiler.

What is needed is a solution that allows for a compiler to establish and handle assert statements.

BRIEF DESCRIPTION

Factored assert chains allow for improved tracking of implicit information in a computer program. The compiler may generate assert statements at various points in the program where there is implicit information. The dominator tree for the program or section of program may then be constructed. Then ϕ-nodes may be inserted throughout a control flow graph. Following that, for each statement in the program or section of program, an assert chain may be constructed from each variable use to the most recent available assert statement for the variable. Then, if the statement is an assert statement, each use may be kept track of as a mapping to an assertion, otherwise a mapping of any reference to an assert statement for each definition may be deleted. This may then iterate through the dominator tree. At the end, a series of factored assert chains remains, which may be utilized by the compiler to improve the efficiency of generated code.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
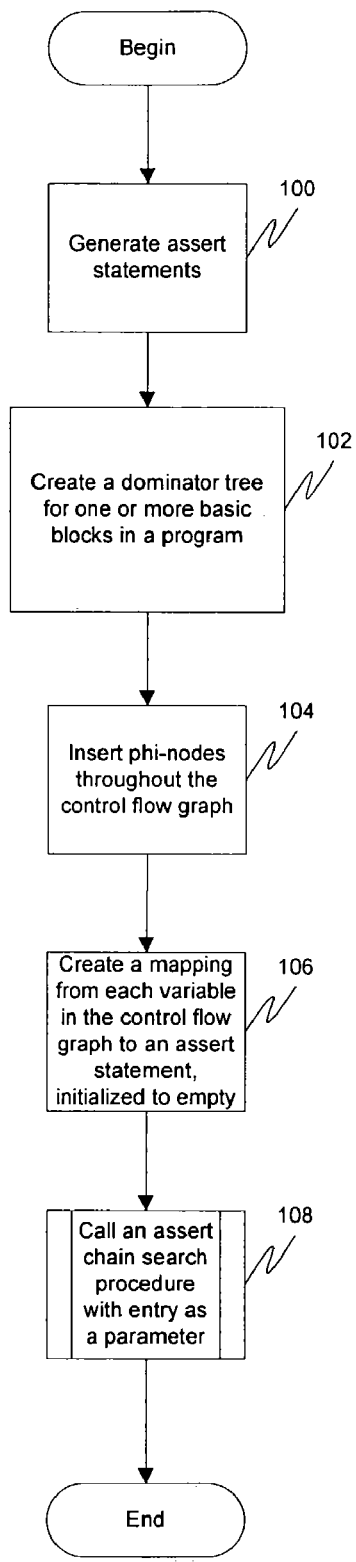
FIG. 1 is a flow diagram illustrating a method for generating factored assert chains in accordance with an embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention provides a mechanism for factored assert chains. The compiler may generate assert statements at various points in the program where there is implicit information. The dominator tree for the program or section of program may then be constructed. Following that, for each statement in the program or section of program, an assert chain may be constructed from each use to the most recent available assert statement for the variable. Then, if the statement is an assert statement, each use may be kept track of as a mapping to an assertion, otherwise a mapping of any reference to an assert statement for each definition may be deleted. This may then iterate through the dominator tree. At the end, a series of factored assert chains remains, which may be utilized by the compiler to speed compiling and improve the efficiency of generated code.

An embodiment of the present invention may be utilized as an extension to the use-def chain creation algorithms described in the prior art. Some of the calculations are similar and thus running both simultaneously can be advantageous.

FIG. 1 is a flow diagram illustrating a method for generating factored assert chains in accordance with an embodiment of the present invention. At 100, the compiler may generate assert statements. This may be accomplished by using information which is implicit in the basic block. One way to accomplish this is to look for if . . . then . . . else (such as "if A<B"). In the block of statements in the "then" part, the compiler may then generate an assert statement indicating "A<B". In the block of statements in the "else" part, the compiler may then generate an assert statement indicating "A>=B". In another example, a do loop may be located in the basic block and an assert statement indicating "stride < >0" may be generated if the stride is variable. Similar rules may be defined for various types of loops, branches, and other areas where implicit information may be identified.

At 102, a dominator tree may be created for one or more basic blocks in a program. At 104, Φ-nodes may be inserted throughout the control flow graph. At 106, a mapping from each variable in the control flow graph to an assert statement may be created and initialized to empty. At 108, an assert chain search procedure may be called with entry as a parameter, wherein entry is a root node of said dominator tree. This will be described in more detail with regard to FIG. 2 and the corresponding text.

Figure 2:
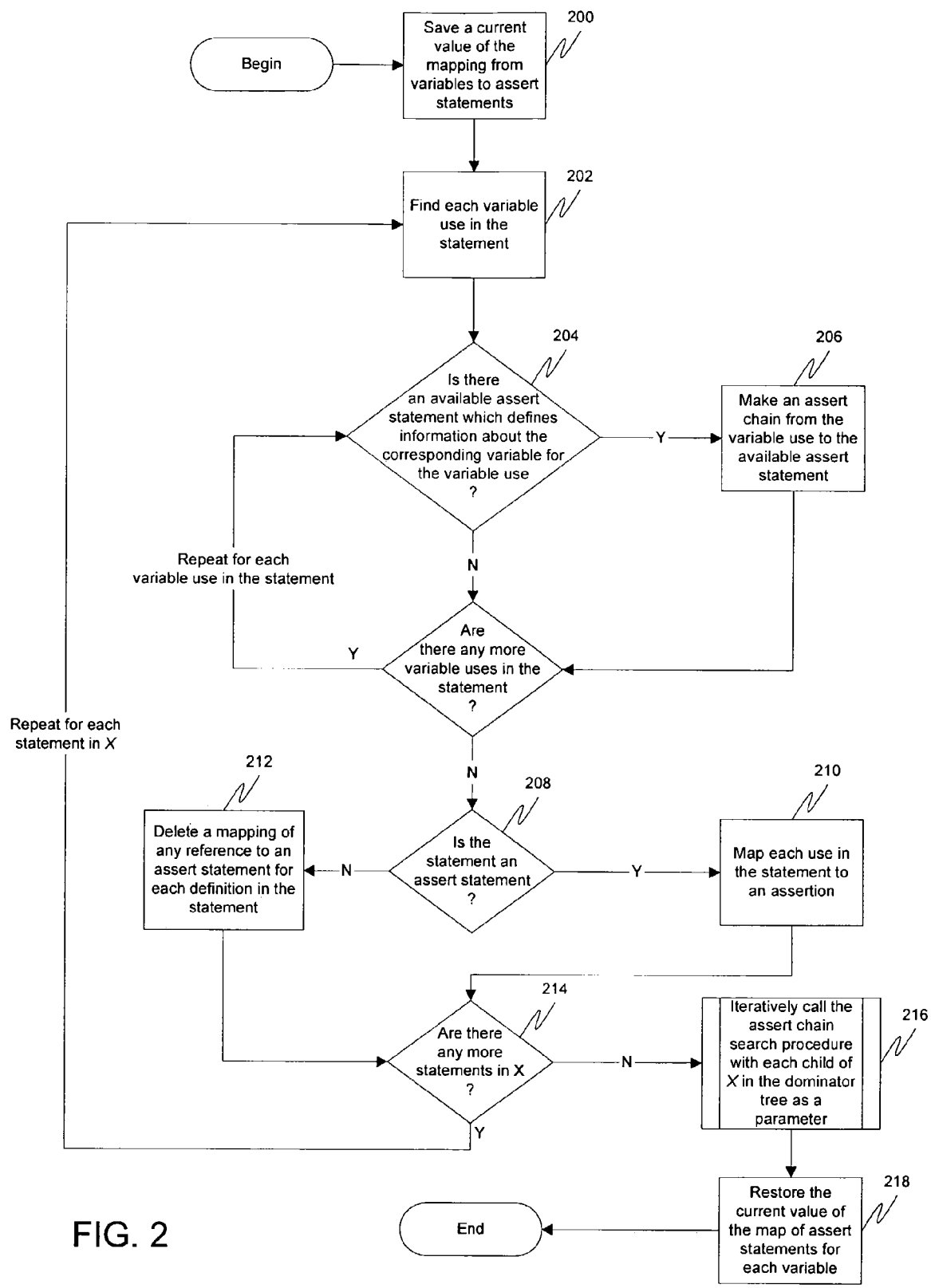
FIG. 2 is a flow diagram illustrating an assert chain search procedure in accordance with an embodiment of the present invention.

FIG. 2 is a flow diagram illustrating an assert chain search procedure in accordance with an embodiment of the present invention. The assert chain search procedure may take a parameter X as input. At 200, a current value of the mapping from variables to assert statements may be saved. 202-212 may be repeated for each statement in X. At 202, each variable use in the statement may be found. At 204, for each variable use in the statement, it may be determined if there is an available assert statement which defines information about the corresponding variable. If so, then at 206 an assert chain may be made from the variable use to the available assert statement. At 208, it may be determined if the statement is an assert statement. If it is, then each use in the assert statement is effectively a definition, and thus at 210 each use in the statement may be mapped to an assertion. One of ordinary skill in the art will recognize that there are many ways to track such information, but one way to keep track would be simply to save that information. If at 208 it is determined that the statement is not an assert statement, then at 212 a mapping of any reference to an assert statement for each definition in the statement may be deleted. Then at 214 it may be determined if there are any more statements in X. If so, then the process may return to 206 to examine the next statement. If not, the process may move to 216, where the assert chain search procedure may be iteratively called for each child of X in the dominator tree. Then at 218, the current value of the map of assert statements for each variable may be restored. This may be done to restore the value of a current assert definition to where it was when the process started, because it is valid for successor basic blocks only.

In an embodiment of the present invention, the algorithm may be as follows. However, one of ordinary skill in the art will recognize that this is just an example and should not be read as limiting.

Algorithm AssertChain:

```
for m in Symbols do
    CurrAssertDef(M) = bottom
end for
AssertChainSearch (Entry)
procedure AssertChainSearch (X)
    // X is a node (basic block)
    SaveAssertDef = CurrAssertDef
    for each statement S in X do
        for each variable use or phi-term R in S do
            Let M be the variable referenced at R
            if CurrAssertDef(M) is not bottom then
                AssertChain(R) = CurrAssertDef(M)
            end if
        end for
        if S is an AssertStint then // each use is a def of an assertion
            for each variable def R in S do
                Let M be the variable referenced at R
                CurrAssertDef(M) = R
            end for
        else
            for each variable def R in S do
                CurrAssertDef(M) = bottom
            end for
        end if
    end for
    for Y in DominanceChild(X) do
        AssertChainSearch (Y)
    end for
    CurrAssertDef = SaveAssertDef
End AssertChainSearch
```

Figure 3:
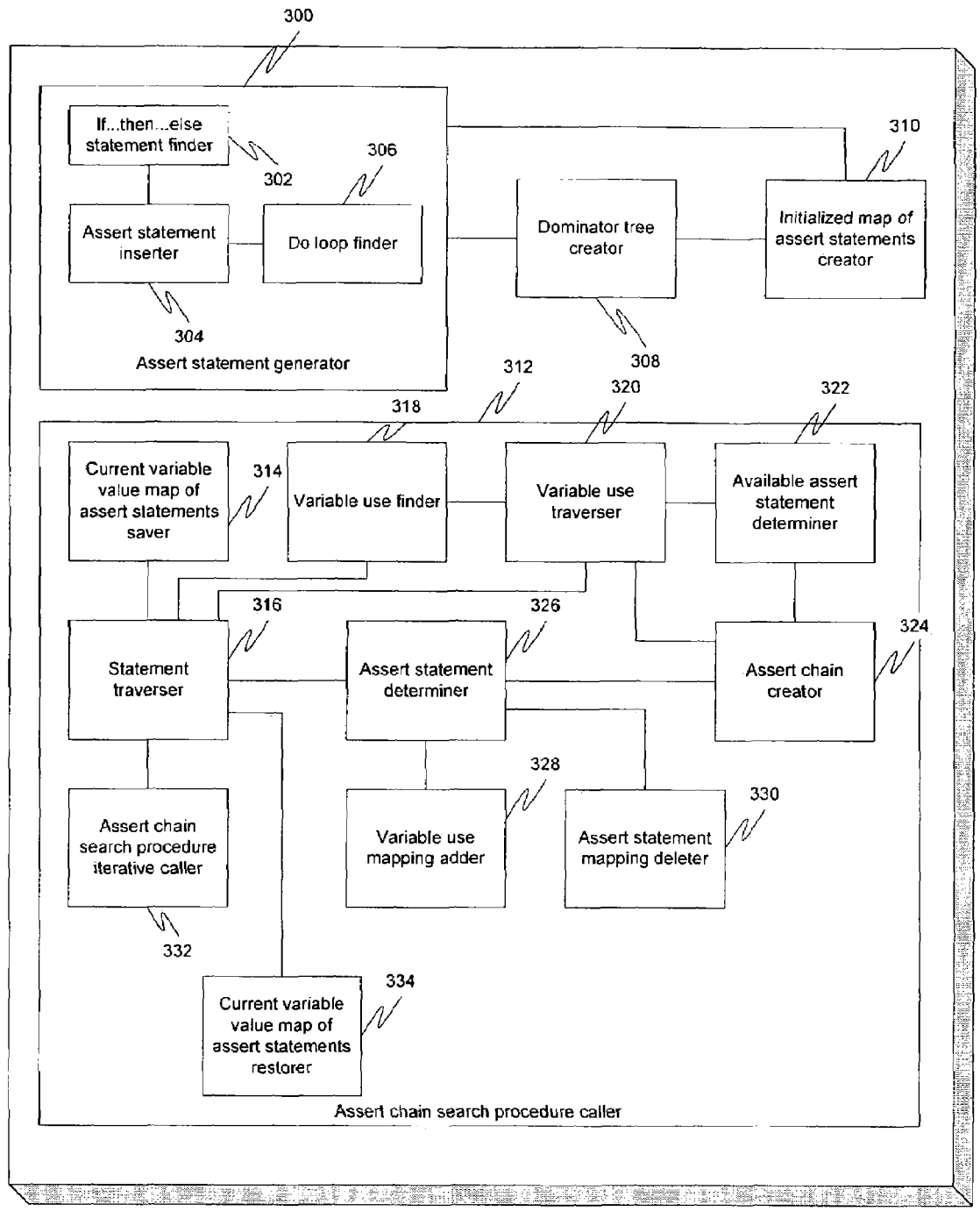
FIG. 3 is a block diagram illustrating an apparatus for generating factored assert chains in accordance with an embodiment of the present invention.

FIG. 3 is a block diagram illustrating an apparatus for generating factored assert chains in accordance with an embodiment of the present invention. An assert statement generator 300 may generate assert statements. This may be accomplished by using implicit statements in the basic block. One way to accomplish this is to look for if . . . then . . . else statements having a comparison after the if (such as "if A<B") by using an if . . . then . . . else statement finder 302. In the block of statements in the "then" part, the compiler may then generate an assert statement indicating "A<B" using an assert statement inserter 304 coupled to the if . . . then . . . else statement finder 302. In the block of statements in the "else" part, the compiler may then generate an assert statement indicating "A>=B" using the assert statement inserter 304. In another example, a do loop may be located in the basic block and an assert statement indicating "stride < >0" may be generated using the assert statement inserter 304 coupled to a do loop finder 306. The stride of a do loop indicates the step value, such as s in a statement "do i=1, n, s". The compiler could insert an assert statement when s is not a constant. Similar rules may be defined for various types of loops, branches, and other areas where implicit information may be identified.

A dominator tree creator 308 coupled to the assert statement generator 300 may create a dominator tree for one or more basic blocks in a program. An initialized map of assert statements creator 310 coupled to the assert statement generator 300 may create a map of assert statements for each variable in the basic blocks, initialized to empty. An assert chain search procedure caller 312 coupled to the initialized map of assert statements creator 310 and to the assert statement generator 300 may call an assert chain search procedure with entry as a parameter, wherein entry is a root node of said dominator tree.

The assert chain search procedure may take a parameter X as input. The assert chain search procedure caller 312 may contain a current variable value map of assert statements saver 314, which may save a current value in the map of assert statements for each variable. A statement traverser 316 coupled to the current variable value map of assert statements saver 314 may repeat several actions for each statement in X. A variable use finder 318 coupled to the statement traverser 316 may find each variable use in the statement. A variable use traverser 320 coupled to the statement traverser 316 and to the variable use finder 318 may repeat several actions for each variable use in the statement. An available assert statement determiner 322 coupled to the variable use traverser 320 may determine if there is an available assert statement which defines information about the corresponding variable. An assert chain creator 324 coupled to the available assert statement determiner 322 and to the variable use traverser 320 may make an assert chain from the variable use to the available assert statement. An assert statement determiner 326 coupled to the statement traverser 316 and to the assert chain creator 324 may determine if the statement is an assert statement. If it is, then a variable use mapping adder 328 coupled to the assert statement determiner 326 may add a mapping for each use in the statement to an assert statement. One of ordinary skill in the art will recognize that there are many ways to track such information, but one way to keep track would be simply to save that information. If it is determined that the statement is not an assert statement, then an assert statement reference mapping deleter 330 coupled to the assert statement determiner 326 may delete the mapping of any reference to an assert statement for each definition in the statement. Then it may be determined if there are any more statements in X. If so, then the process may repeat and examine the next statement. If not, the process may iteratively call the assert chain search procedure for each child of X in the dominator tree using an assert chain search procedure iterative caller 332 coupled to the statement traverser 316. Then the current value of the map of assert statements for each variable may be restored using a current variable value map of assert statements restorer 334 coupled to the statement traverser 316. This may be done to restore the value of a current assert definition to where it was when the process started, because it is valid for successor basic blocks only.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for generating factored assert chains from assert statements in a program using a compiler, the program having a dominator tree, wherein the method has an input parameter X initially assigned an entry node of said dominator tree, the method comprising:
   for each statement S in X:
      finding each variable use in the statement S;
      for each variable use in the statement S:
         determining if there is an available assert statement which defines information about the corresponding variable for the variable use, wherein an assert statement is a statement identifying known information regarding a variable at a specific point in said program;
         making an assert chain from the variable use to the available assert statement it there is an available assert statement which defines information about the corresponding variable for the variable use; and
   iteratively calling the method using each child of X in the dominator tree as a parameter.

2. The method of claim 1, further comprising saving a current value in a map of assert statements for each variable.

3. The method of claim 1, further comprising:
   determining if the statement is an assert statement after said making;
   adding a mapping from each variable use in the statement to an assert statement if the statement is an assert statement; and
   deleting a mapping of any reference to an assert statement for each definition in the statement if the statement is not an assert statement.

4. The method of claim 1, further comprising restoring a current value of a map of assert statements for each variable after said iteratively calling.

5. A method for generating factored assert chains for a program in a compiler, the method comprising:
   generating one or more assert statements in a basic block of the program, wherein an assert statement is a statement identifying known information regarding a variable at a specific point in said program;
   creating a dominator tree for said basic block;
   creating an initialized map of assert statements for each variable in said basic block; and
   calling an assert chain search procedure with entry as a parameter, wherein entry is a root node of said dominator tree, and further wherein said assert chain search procedure instructions executable by the machine to perform a method for generating factored assert chains for a program in a compiler, the method comprising:
      generating one or more assert statements in a basic block of the program, wherein an assert statement is a statement identifying known information regarding a variable at a specific point in said program;
      creating a dominator tree for said basic block;
      creating an initialized map of assert statements for each variable in said basic block; and
      calling an assert chain search procedure with entry as a parameter, wherein entry is a root node of said dominator tree, and further wherein said assert chain search procedure has an input parameter X, the assert chain search procedure comprising:
         for each statement S in X:
            finding each variable use in the statement S;
            for each variable use in the statement S:
               determining if there is an available assert statement which defines information about the corresponding variable for the variable use;
               making an assert chain from the variable use to the available assert statement if there is an available assert statement which defines information about the corresponding variable for the variable use; and
         iteratively calling the method using each child of X in the dominator tree as a parameter.

6. The method of claim 5, wherein said generating includes:

finding an if . . . then . . . else statement in said basic block, said if . . . then . . . else statement having a condition, a then portion, and an else portion;
   inserting an assert statement indicating that said condition is true in said then portion; and
   inserting an assert statement indicating that said condition is false in said else portion.

7. The method of claim 5, wherein said generating includes:
   finding a do loop, said do loop having a non-constant stride; and
   inserting an assert statement indicating that said stride is not equal to zero.

8. The method of claim 5, wherein said assert chain search procedure further comprises saving a current value in a map of assert statements for each variable.

9. The method of claim 5, wherein said assert chain search procedure further comprises:
   determining if the statement S is an assert statement after said making;
   adding a mapping from each variable use in the statement S to an assert statement if the statement S is an assert statement; and
   deleting a mapping of any reference to an assert statement for each definition in the statement S if the statement S is not an assert statement.

10. The method of claim 5, wherein said assert chain search procedure further comprises restoring a current value of a map of assert statements for each variable after said iteratively calling.

11. An apparatus for generating factored assert chains for a program from assert statements, wherein an assert statement is a statement identifying known information regarding a variable at a specific point in said program, the apparatus comprising:
   a memory having stored therein at least a portion of an application for generating factored assert chains for a program from assert statements, said application comprising:
      statement traverser;
      a variable use finder coupled to said statement traverser;
      a variable use traverser coupled to said statement traverser and said variable use finder;
      an available assert statement determiner coupled to said variable user traverser;
      an assert chain creator coupled to said available assert statement determiner and to said variable use traverser, said assert chain creator for generating factored assert chains from assert statements associated with a program; and
      an assert chain search procedure iterative caller coupled to said statement traverser; and
   a processor coupled to said memory, said processor for executing said at least a portion of said application.

12. The apparatus of claim 11, further comprising a current variable value map of assert statements saver coupled to said statement traverser.

13. The apparatus of claim 11, further comprising:
   an assert statement determiner coupled to said statement traverser and to said assert chain creator;
   a variable use mapping adder coupled to said assert statement determiner; and
   an assert statement reference mapping deleter coupled to said assert statement determiner.

14. The apparatus of claim 11, further comprising a current variable value map of assert statements restorer coupled to said statement traverser.

15. An apparatus for generating factored assert chains for a program in a compiler, the apparatus comprising:
   a memory having stored therein at least a portion of an application for generating factored assert chains for a program from assert statements, said application comprising:
      an assert statement generator, wherein an assert statement is a statement identifying known information regarding a variable at a specific point in said program;
      a dominator tree creator coupled to said assert statement generator;
      an initialized map of assert statements creator coupled to said assert statement generator; and
      an assert chain search procedure caller coupled to said initialized map of assert statements creator and to said dominator tree creator, wherein said assert chain search procedure has an input parameter X, the assert chain search procedure comprising:
         for each statement S in X:
            finding each variable use in the statement S;
            for each variable use in the statement S:
               determining if there is an available assert statement which defines information about the corresponding variable for the variable use;
               making an assert chain from the variable use to the available assert statement if there is an available assert statement which defines information about the corresponding variable for the variable use; and
            iteratively calling the method using each child of X in the dominator tree as a parameter; and
   a processor coupled to said memory, said processor for executing said at least a portion of said application.

16. The apparatus of claim 15, wherein said assert statement generator includes:
   an if . . . then . . . else statement finder; and
   an assert statement inserter coupled to said if . . . then . . . else statement finder.

17. The apparatus of claim 15, wherein said assert statement generator includes:
   a do loop finder; and
   an assert statement inserter coupled to said do loop finder.

18. The apparatus of claim 15, wherein said assert chain search procedure caller includes:
   a statement traverser;
   a variable use finder coupled to said statement traverser;
   a variable use traverser coupled to said statement traverser and said variable use finder;
   an available assert statement determiner coupled to said variable user traverser;
   an assert chain creator coupled to said available assert statement determiner and to said variable use traverser; and
   an assert chain search procedure iterative caller coupled to said statement traverser.

19. The apparatus of claim 18, wherein said assert chain search procedure caller further comprises a current variable value map of assert statements saver coupled to said statement traverser.

20. The apparatus of claim 18, wherein said assert chain search procedure caller further comprises:
   an assert statement determiner coupled to said statement traverser and to said assert chain creator;

a variable use mapping adder coupled to said assert statement determiner; and an assert statement reference mapping deleter coupled to said assert statement determiner.

21. The apparatus of claim 18, wherein said assert chain search procedure caller further comprises a current variable value map of assert statements restorer coupled to said statement traverser.

22. A computer-based apparatus for, generating factored assert chains from assert statements in a program using a compiler, the program having a dominator tree, wherein the method has an input parameter X initially assigned an entry node of said dominator tree, the apparatus comprising:

a memory having stored therein at least a portion of an application for generating factored assert chains for a program from assert statements; for each statement S in X:

means for finding each variable use in the statement S;

for each variable use in the statement S:

means for determining if there is an available assert statement which defines information about the corresponding variable for the variable use, wherein an assert statement is a statement identifying known information regarding a variable at a specific point in said program;

means for making an assert chain from the variable use to the available assert statement if there is an available assert statement which defines information about the corresponding variable for the variable use; and means for iteratively calling the method using each child of X in the dominator tree as a parameter.

23. The apparatus of claim 22, further comprising means for saving a current value in a map of assert statements for each variable.

24. The apparatus of claim 22, further comprising:

means for determining if the statement S is an assert statement after said making;

means for adding a mapping from each variable use in the statement S to an assert statement if the statement S is an assert statement; and means for deleting a mapping of any reference to an assert statement for each definition in the statement S if the statement S is not an assert statement.

25. The apparatus of claim 22, further comprising means for restoring a current value of a map of assert statements for each variable after said iteratively calling.

26. A computer-based apparatus for generating factored assert chains for a program in a compiler, the apparatus comprising:

a memory having stored therein at least a portion of an application for generating factored assert chains for a program from assert statements;

means for generating one or more assert statements in a basic block of the program, wherein an assert statement is a statement identifying known information regarding a variable at a specific point in said program;

means for creating a dominator tree for said basic block;

means for creating an initialized map of assert statements for each variable in said basic block; and means for calling an assert chain search procedure with entry as a parameter, wherein entry is a root node of said dominator tree, and further wherein said assert chain search procedure has an input parameter X, the assert chain search procedure comprising:

for each statement S in X:

means for finding each variable use in the statement S;

for each variable use in the statement S:

means for determining if there is an available assert statement which defines information about the corresponding variable for the variable use;

means for making an assert chain from the variable use to the available assert statement if there is an available assert statement which defines information about the corresponding variable for the variable use; and means for iteratively calling the method using each child of X in the dominator tree as a parameter.

27. The apparatus of claim 26, wherein said means for generating includes:

means for finding an if . . . then . . . else statement in said basic block, said if . . . then . . . else statement having a condition, a then portion, and an else portion;

means for inserting an assert statement indicating that said condition is true in said then portion; and means for inserting an assert statement indicating that said condition is false in said else portion.

28. The apparatus of claim 26, wherein said means for generating includes:

means for finding a do loop, said do loop having a non-constant stride; and means for inserting an assert statement indicating that said stride is not equal to zero.

29. The apparatus of claim 26, wherein said assert chain search procedure further comprises means for saving a current value in a map of assert statements for each variable.

30. The apparatus of claim 26, wherein said assert chain search procedure further comprises:

means for determining if the statement S is an assert statement after said making;

means for adding a mapping from each variable use in the statement S to an assert statement if the statement S is an assert statement; and means for deleting a mapping of any reference to an assert statement for each definition in the statement if the statement S is not an assert statement.

31. The apparatus of claim 26, wherein said assert chain search procedure further comprises means for restoring a current value of a map of assert statements for each variable after said iteratively calling.

32. A program storage device readable by a machine, tangibly embodying a program of instructions executable by the machine to perform a method for generating factored assert chains from assert statements in a program using a compiler, the program having a dominator tree, wherein the method has an input parameter X initially assigned an entry node of said dominator tree, the method comprising:

for each statement S in X:

finding each variable use in the statement S;

for each variable use in the statement S:

determining if there is an available assert statement which defines information about the corresponding variable for the variable use, wherein an assert statement is a statement identifying known information regarding a variable at a specific point in said program;

making an assert chain from the variable use to the available assert statement if there is an available assert statement which defines information about the corresponding variable for the variable use; and iteratively calling the method using each child of X in the dominator tree as a parameter.

33. A program storage device readable by a machine, tangibly embodying a program of instructions executable by the machine to perform a method for generating factored assert chains for a program in a compiler, the method comprising:

generating one or more assert statements in a basic block of the program, wherein an assert statement is a statement identifying known information regarding a variable at a specific point in said program;

creating a dominator tree for said basic block;

creating an initialized map of assert statements for each variable in said basic block; and calling an assert chain search procedure with entry as a parameter, wherein entry is a root node of said dominator tree, and further wherein said assert chain search procedure has an input parameter X, the assert chain search procedure comprising:

for each statement S in X:
    finding each variable use in the statement S;
    for each variable use in the statement S;
        determining if there is an available assert statement which defines information about the corresponding variable for the variable use;
        making an assert chain from the variable use to the available assert statement if there is an available assert statement which defines information about the corresponding variable for the variable use; and iteratively calling the method using each child of X in the dominator tree as a parameter.

* * * * *

UNITED STATES PATENT AND TRADEMARK OFFICE
CERTIFICATE OF CORRECTION

PATENT NO. : 7,272,829 B1 Page 1 of 1
APPLICATION NO. : 10/625334
DATED : September 18, 2007
INVENTOR(S) : Diane R. Meirowiz It is certified that error appears in the above-identified patent and that said Letters Patent is hereby corrected as shown below:

In Column 8, Claim 5, Line 35, delete "calling an assert chain search procedure with entry as a parameter, wherein entry is a root node of said dominator tree, and further wherein said assert chain search procedure instructions executable by the machine to perform a method for generating factored assert chains for a program in a compiler, the method comprising: generating one or more assert statements in a basic block of the program wherein an assert statement is a statement identifying known information regarding a variable at a specific point in said program;creating a dominator tree for said basic block;creating an initialized map of assert statements for each variable in said basic block; and".
In Column 9, Claim 11, Line 40, prior to "statement", insert --a--.
In Column 11, Claim 22, Line 9, after "for", delete ",".
In Column 14, Claim 33, Line 5, replace ";" with --:--.

Signed and Sealed this

Twenty-ninth Day of April, 2008

JON W. DUDAS
*Director of the United States Patent and Trademark Office*